US008066941B2

(12) United States Patent
Denkewicz, Jr. et al.

(10) Patent No.: US 8,066,941 B2
(45) Date of Patent: *Nov. 29, 2011

(54) APPARATUS AND METHOD FOR PURIFYING WATER IN A STORAGE TANK

(75) Inventors: Raymond P. Denkewicz, Jr., East Greenwich, RI (US); Rolf Engelhard, Prescott, AZ (US)

(73) Assignee: Zuvo Water, LLC, Mountain View, CA (US)

(*) Notice: Subject to any disclaimer, the term of this patent is extended or adjusted under 35 U.S.C. 154(b) by 943 days.

This patent is subject to a terminal disclaimer.

(21) Appl. No.: 11/770,594

(22) Filed: Jun. 28, 2007
(Under 37 CFR 1.47)

(65) Prior Publication Data

US 2008/0302737 A1  Dec. 11, 2008

Related U.S. Application Data

(60) Provisional application No. 60/806,331, filed on Jun. 30, 2006.

(51) Int. Cl.
*C02F 1/32* (2006.01)
(52) U.S. Cl. ............... 422/24; 422/186; 210/748.01; 210/748.12; 210/192
(58) Field of Classification Search ............ 210/760, 210/748.01–748.1, 739, 600, 748.12; 261/36.1, 261/16, 192, 758; 422/20, 24, 186, 186.01, 422/186.04
See application file for complete search history.

(56) References Cited

U.S. PATENT DOCUMENTS 2,970,821 A   2/1961 Axt ........................ 261/16

(Continued)

FOREIGN PATENT DOCUMENTS

DE    3828026 A1    2/1990

(Continued)

OTHER PUBLICATIONS

Article entitled, "Fountainhead Technologies Talks About Their Unique Approach to Catalytic Water Purification", The Catalyst Review, Nov. 1994, pp. 1, 7-9.

(Continued)

*Primary Examiner* — Walter Griffin
*Assistant Examiner* — Cameron J Allen
(74) *Attorney, Agent, or Firm* — Mark J. Danielson; Pillsbury Winthrop Shaw Pittman LLP

(57) ABSTRACT

A pressurized water tank having a head space includes a pump for recirculating the water through a nozzle disposed in the head space. The out flowing stream of water will entrain air and cause mixing of air entrained water with the remaining water in the tank. To enhance air entrainment and convey the air entrained water to a location well below the water level, the stream of water is injected into a vertical venturi tube. The entrained air will have an oxidizing effect upon organic matter and also cause circulation of the water within the tank. To enhance oxidation of organic and inorganic matter, a UV lamp may be located in the head space to convert oxygen molecules in the air into ozone molecules. Such ozone molecules would be entrained in the stream of water flowing out of the nozzle and into the tube and have a strong oxidizing effect upon organic and inorganic matter. UV radiation from the UV lamp will also have a virucidal and germicidal effect upon microorganisms on the surface of the water and in water to some depth below the water surface.

27 Claims, 3 Drawing Sheets

U.S. PATENT DOCUMENTS

| | | | | |
|---|---|---|---|---|
| 3,336,099 A | | 8/1967 | Czulak et al. | 21/102 |
| 3,550,782 A | | 12/1970 | Veloz | 210/192 |
| 3,696,932 A | | 10/1972 | Rosenberg | 210/437 |
| 3,726,404 A | | 4/1973 | Troglione | 210/139 |
| 3,740,320 A | * | 6/1973 | Arthur | 435/39 |
| 4,069,153 A | | 1/1978 | Gunther | 210/64 |
| 4,141,830 A | | 2/1979 | Last | 210/63 Z |
| 4,176,061 A | | 11/1979 | Stopka | 210/63 Z |
| 4,179,616 A | | 12/1979 | Coviello et al. | 250/527 |
| 4,207,180 A | * | 6/1980 | Chang | 210/612 |
| 4,230,571 A | | 10/1980 | Dadd | 3/8 |
| 4,273,660 A | | 6/1981 | Beitzel | 210/760 |
| 4,274,970 A | | 6/1981 | Beitzel | 210/748 |
| 4,323,810 A | | 4/1982 | Horstmann | 313/24 |
| 4,422,450 A | | 12/1983 | Rusteberg | 128/62 A |
| 4,437,999 A | | 3/1984 | Mayne | 210/748 |
| 4,694,179 A | | 9/1987 | Lew et al. | 250/431 |
| 4,752,401 A | | 6/1988 | Bodenstein | 210/746 |
| 4,857,204 A | | 8/1989 | Joklik | 210/695 |
| 4,892,712 A | | 1/1990 | Robertson et al. | 422/186 |
| 4,913,827 A | | 4/1990 | Nebel | 210/748 |
| 4,968,437 A | | 11/1990 | Noll et al. | 210/748 |
| 5,043,079 A | | 8/1991 | Hallett | 1/32 |
| 5,082,558 A | | 1/1992 | Burris | 210/167 |
| 5,106,495 A | | 4/1992 | Hughes | 210/139 |
| 5,106,501 A | | 4/1992 | Yang et al. | 210/266 |
| 5,120,450 A | | 6/1992 | Stanley, Jr. | 210/748 |
| 5,141,636 A | | 8/1992 | Flanagan et al. | 210/209 |
| 5,153,106 A | * | 10/1992 | Liu | 430/340 |
| 5,158,454 A | | 10/1992 | Viebahn et al. | 433/82 |
| 5,178,755 A | | 1/1993 | LaCrosse | 210/210 |
| 5,178,758 A | | 1/1993 | Hwang | 210/256 |
| 5,180,499 A | | 1/1993 | Hinson et al. | 210/706 |
| 5,207,993 A | | 5/1993 | Burris | 422/256 |
| 5,213,773 A | | 5/1993 | Burris | 422/256 |
| 5,230,792 A | | 7/1993 | Sauska et al. | 1/32 |
| 5,266,215 A | | 11/1993 | Engelhard | 210/748 |
| 5,268,104 A | | 12/1993 | Masoomain | 210/638 |
| 5,302,298 A | | 4/1994 | Leitzke | 210/748 |
| 5,352,369 A | | 10/1994 | Heinig, Jr. | 210/760 |
| 5,431,861 A | | 7/1995 | Nagahiro et al. | 261/140.1 |
| 5,520,893 A | | 5/1996 | Kasting, Jr. et al. | 422/305 |
| 5,540,848 A | | 7/1996 | Engelhard | 210/748 |
| 5,547,590 A | | 8/1996 | Szabo | 210/748 |
| 5,709,799 A | | 1/1998 | Engelhard | 210/748 |
| 5,935,431 A | | 8/1999 | Korin | 210/205 |
| 5,942,125 A | | 8/1999 | Engelhard et al. | 210/748 |
| 6,267,895 B1 | | 7/2001 | Engelhard et al. | 210/748 |
| 6,461,520 B1 | | 10/2002 | Engelhard et al. | 210/748 |
| 6,491,879 B2 | | 12/2002 | Conrad | 422/186.18 |
| 6,511,594 B2 | | 1/2003 | Shaw | 210/120 |
| 6,511,638 B2 | | 1/2003 | Matsuzaki | 422/186.18 |
| 2008/0302735 A1 | * | 12/2008 | Denkewicz et al. | 210/748 |

FOREIGN PATENT DOCUMENTS

| | | | | |
|---|---|---|---|---|
| EP | 0 235 315 | 2/1985 | | |
| EP | 0 237 793 | 2/1987 | | |
| EP | 0 227 266 | 7/1987 | | |
| EP | 0 316 687 | 5/1989 | | |
| JP | 3-143586 A | 6/1991 | | |
| JP | 4-141296 A | 5/1992 | | |
| WO | PCT/US94/3689 | 11/1994 | | 1/32 |
| WO | PCT/US99/13591 | 12/1999 | | 2/8 |
| WO | PCT/US00/13839 | 11/2000 | | 35/6 |

OTHER PUBLICATIONS

US 5,159,606, 12/1992, Batchelor (withdrawn).

* cited by examiner

APPARATUS AND METHOD FOR PURIFYING WATER IN A STORAGE TANK

CROSS REFERENCE TO RELATED APPLICATIONS

The present application is related to and claims priority to a provisional patent application entitled "VENTURI TUBE FOR INJECTING OZONE AND METHOD" filed Jun. 30, 2006 and assigned Ser. No. 60/806,331 and discloses an invention made by the present inventors.

BACKGROUND OF THE INVENTION

1. Field of the Invention

The present invention relates to purification of water storage tanks under pressure with a water recirculating capability to entrain air therein and ozone produced by a UV lamp is mounted therein that also provides radiation for virucidal and germicidal purposes.

2. Description of Related Prior Art

Presently, pressurized water storage tanks are commercially available which tanks rely upon the pressure of inflowing water, as might be present in a municipal water system, to provide a flow of water upon opening a tap or the like. These tanks include a lower section housing inflowing water and an outlet conduit extends therefrom for discharge of the water. A head space exists in the upper section of the water tank which will become pressurized as a function of the pressure of the inflowing water from a municipal system or the like. A vent in the form of a conduit or the like extends downwardly into the upper section of the water storage tank to permit discharge of air when the water level drops below the inlet to the vent. As water is withdrawn from the water storage tank, the discharged water is replaced by water flowing into the tank. The water level within the water storage tank will rise above the inlet of the vent until the air pressure in the upper section essential corresponds with the pressure of the water flowing into the tank. In the event of rapid discharge of water at a rate in excess of the water inflow rate, the water level may drop below the inlet to the vent. In such event, the air pressure within the upper section of the water tank will be immediately reduced to atmospheric pressure and enhance fill to a predetermined water level as back pressure for the inflowing water has been removed.

Water storage tanks of this type have been extensively used in residential and commercial environments. Depending upon numerous factors, the quality of the water may be degraded due to the presence and growth of various microorganisms, including bacteria, viruses, algae, etc. Additionally, the water may contain iron, manganese, arsenic, other natural organic matter, pesticides, sulfur based compounds (such as hydrogen sulfide) or any other oxidizable compounds. The presence of this foreign matter may present not only a health hazard but also render the water unpalatable or un-potable.

SUMMARY OF THE INVENTION

The present invention relates to purification of water under pressure in a storage tank having a head space. A small recirculating pump pumps water into the head space to entrain air in the water and bring about an oxidizing effect upon matter within the water by in the storage tank. To enhance the oxidizing function, a UV lamp may be located in the head space to convert oxygen molecules into ozone molecules and the ozone enriched air will become entrained in the water to enhance the oxidizing function. The UV radiation from the UV lamp will have a virucidal and germicidal effect upon microorganisms at least close to the surface of the water. To enhance the virucidal and germicidal properties, the UV lamp may be submerged to irradiate surrounding water and located in the path of the air entrained in the water to convert air molecules therein into ozone molecules with the resulting oxidizing benefits.

It is therefore a primary object of the present invention to provide ozone enriched air entrained within the water in a pressurized water tank to oxidize organic matter that may be present.

Another object of the present invention is to provide apparatus for entraining air in the water in a pressurized water tank having a head space.

Yet another object of the present invention is to provide UV radiation from a UV lamp within a pressurized water storage tank to kill microorganisms that may be present.

Still another object of the present invention is to provide a UV lamp submerged within the water in a pressurized water tank to irradiate and kill any microorganisms that may be present.

A further object of the present invention is to provide a submerged UV lamp within a pressurized water tank to convert oxygen molecules in air entrained within the water into ozone molecules to assist in oxidizing organic matter.

A yet further object of the present invention is to provide a method for purifying the water in a water storage tank under pressure.

A yet further object of the present invention is to provide a UV lamp disposed in the water of a water storage tank under pressure to create ozone molecules in air entrained within the water and to irradiate micro-organisms.

A still further object of the present invention is to provide a method for oxidizing organic and inorganic matter and for irradiating microorganisms that may be present in the water of a pressurized water tank.

These and other objects of the present invention will become apparent to those skilled in the art as the description thereof proceeds.

BRIEF DESCRIPTION OF THE DRAWINGS

The present invention will be described with greater specificity and clarity with reference to the drawings, in which.

DESCRIPTION OF THE PREFERRED EMBODIMENT

Figure 1:
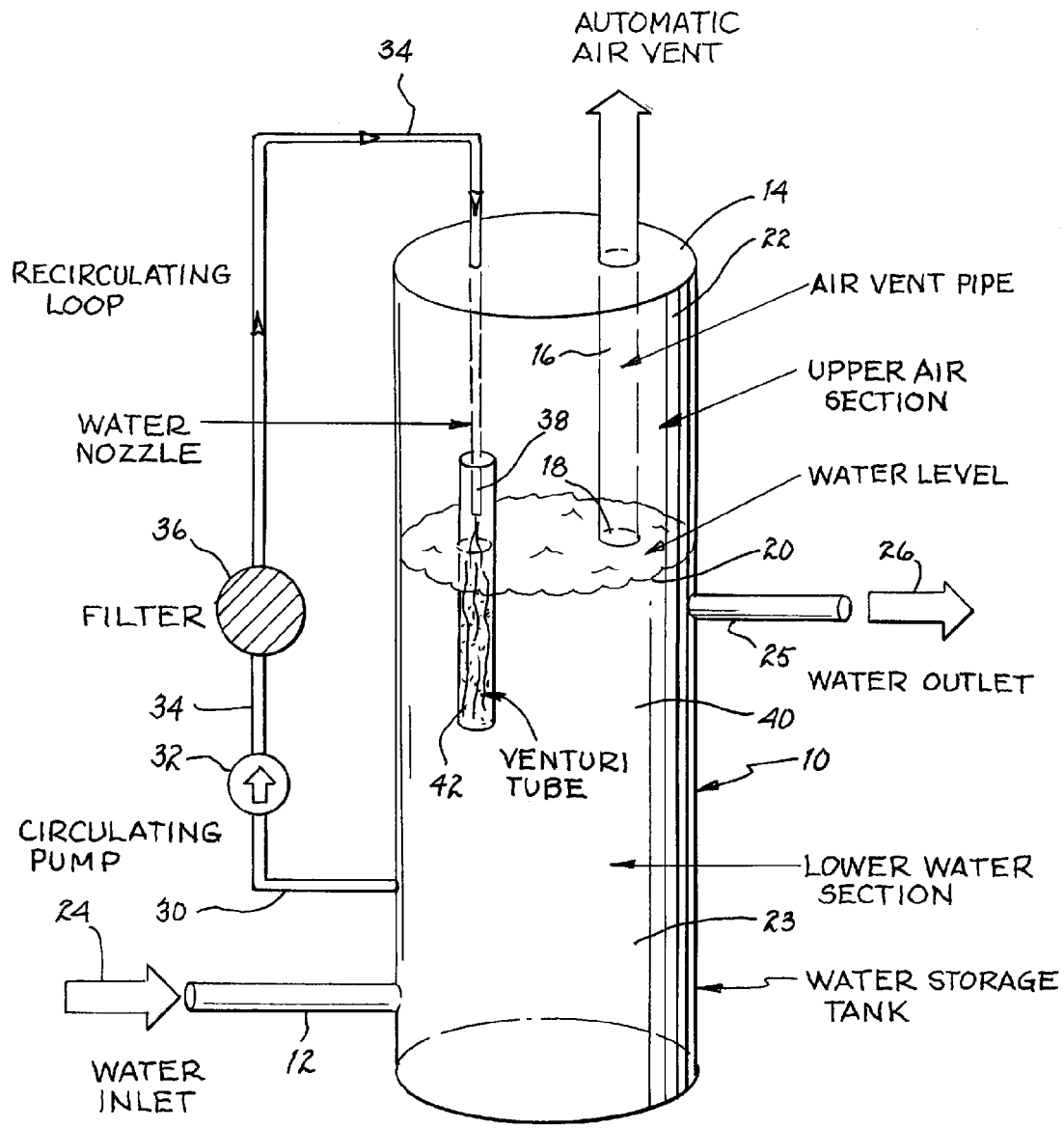
FIG. 1 illustrates a pressurized water storage tank having water recirculating apparatus for entraining air in the water.

Referring to FIG. 1, there is illustrated a water storage tank 10 having an inlet conduit 12 for supplying water under pressure into the tank. Top 14 of tank 10 is closed and a conduit 16 extends from the top into the tank to locate outlet 18 some distance from the top of the tank. This conduit serves in the manner of a vent. That is, as water enters the tank through inlet conduit 12, the water level 20 will rise unimpeded until it reaches outlet 18. At that point, head space 22, defining an upper air section, is essentially at ambient pressure. As the pressure of the water flowing into lower water section 23 is at a pressure essentially equivalent to that of the inflowing water represented by arrow 24, water level 20 will rise past outlet 18 until the air pressure within the head space is essentially equivalent to the water pressure in the lower water section. Outlet water conduit 25 provides a flow of water, represented by arrow 26, on demand by operation of a valve downstream. As the water flows out of tank 10, it will be replenished by water inflowing through inlet conduit 12 and water level 20 will remain essentially constant. Water tanks constructed and operated in the manner discussed above are provided by various commercial entities for residential and commercial use.

If inflowing water 24 is from a municipal water source, it will contain certain additives (such as chlorine) to reduce the likelihood of fouling, restrain growth of microorganisms and the presence of other organic matter. However, if the rate of flow-through of water through the tank is low, the water may become stagnant and the virucidal and germicidal properties of additives to the water may lose effectiveness. As a result, microorganisms may begin to populate the water and other forms of life, such as algae, may grow. The resulting condition of the water will be not only unpalatable but may create a health hazard.

To enhance the quality of the water within tank 10 and to some extend irrespective of the water flow-through rate, the air may be entrained within the water in order to permit the oxygen molecules therein to perform an oxidizing effect upon organic matter. The apparatus for accomplishing this result is described below with reference to FIG. 1.

A conduit 30 is in fluid communication with the water in lower water section 23. Water is withdrawn from tank 10 by a pump 32 in fluid communication with conduit 30 and will cause a flow of water through conduit 34. A filter 36 may be incorporated in conduit 34 to perform a filtration function. Conduit 34 extends into tank 10 and is terminated by a nozzle 38. The water discharged through the nozzle is directed downwardly into water 40 in tank 10 and will strike the water with some force. The passage of water through the air, as well as its impact on the water at water level 20, will cause the air from head space 22 to become entrained in the stream of water from nozzle 38 and in water 40. To enhance entrainment of the air, a tube 42 is located above and below water level 20 to receive the water ejected from nozzle 38. It may be preferable to have the nozzle and the stream of water essentially coincident with the longitudinal axis of the tube. This tube serves in the manner of a venturi and will augment entrainment of the air into the stream of water and water 40 in the tank. As a result of the entrained air, it will have an oxidizing effect upon organic matter and cause a level of destruction of the organic matter. Thereby, the entrained air will perform a purifying function on water 40 within tank 10.

Figure 2:
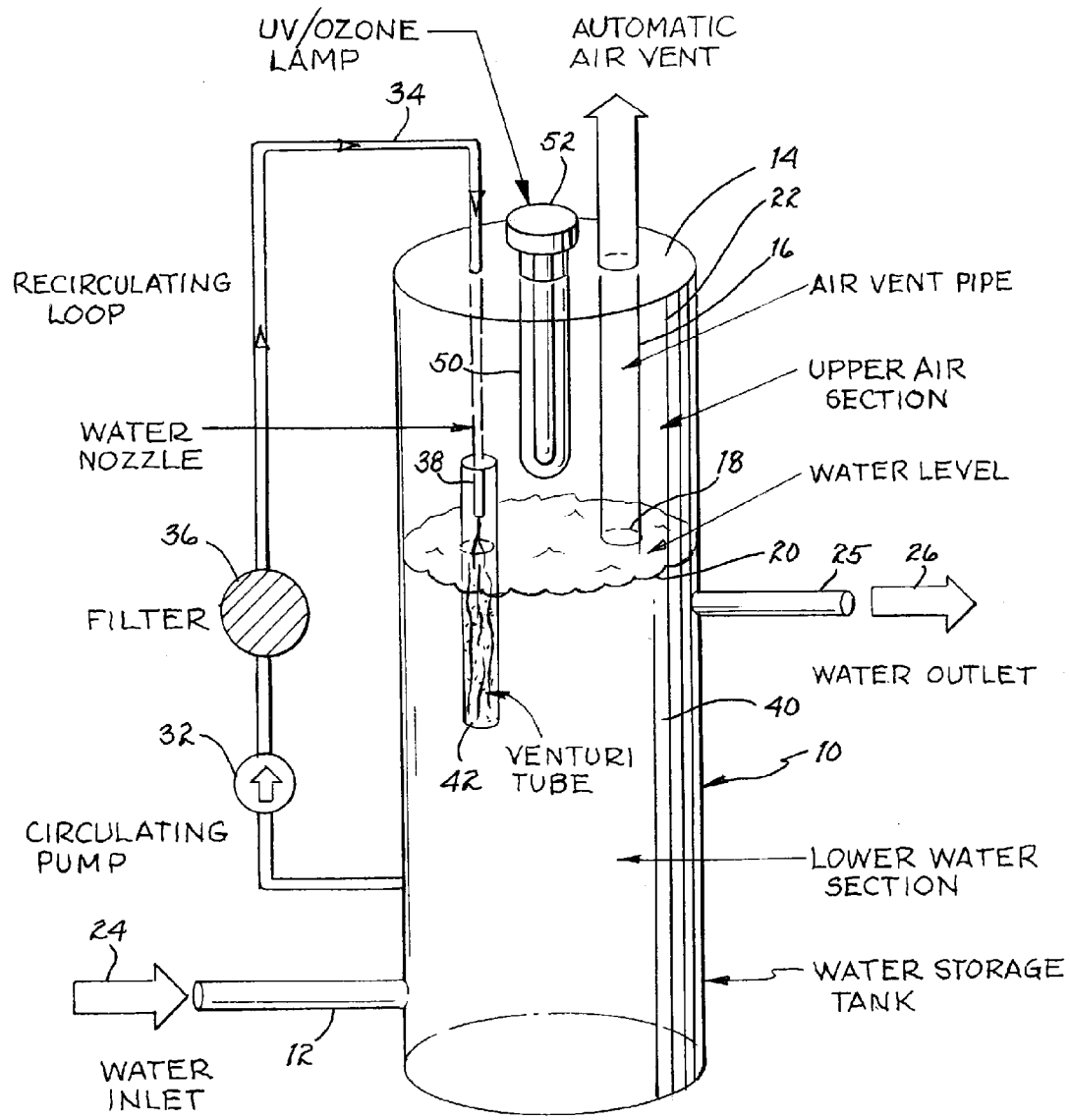
FIG. 2 illustrates a pressurized water tank shown in FIG. 1 and including a UV lamp for converting oxygen molecules in the head space into ozone molecules for entrainment in the water.

FIG. 2 illustrates a pressurized water tank 10 essentially the same as that shown and described with respect to FIG. 1 but with additional structure and function to provide enhanced capability. An ultraviolet lamp (UV lamp) 50 extends into head space 22 in the upper air section of tank 10. A mounting 52 including electrical connections, is representatively shown as being supported at top 14. Preferably, the UV lamp will emit radiation in wavelengths of at least 185 nm (UV 185). Radiation at this frequency will cause oxygen molecules in the air within head space 22 to be converted to ozone molecules. These ozone molecules will permeate the head space. As a result of the stream of water flowing from nozzle 38, the air, and now including ozone molecules, will become entrained within the stream of water and within water 40. The presence of the ozone molecules in the water will have a tendency to oxidize any organic and some inorganic matter coming in contact therewith. Thereby, the ozone produced and entrained in the water will assist in purifying and maintaining pure the water in tank 10.

Additionally, if the radiation from UV lamp 50 includes a wavelength of 254 nm (UV 254), radiation at this frequency will have a virucidal and germicidal effect and disinfect the water at the water level the water beneath the water level to the extent of penetration of the radiation. Thereby, UV lamp 50 has a secondary benefit in purifying and maintaining pure the water in tank 10.

As with the embodiment of the present invention illustrated in FIG. 1, water 40 will be caused to circulate about the lower section of tank 10 as a result of the downward flow of water from nozzle 38. This will help to stir the water and thereby cause all of the water to become subjected to the purifying effects of air entrainment, ozone entrainment and UV irradiation.

Figure 3:
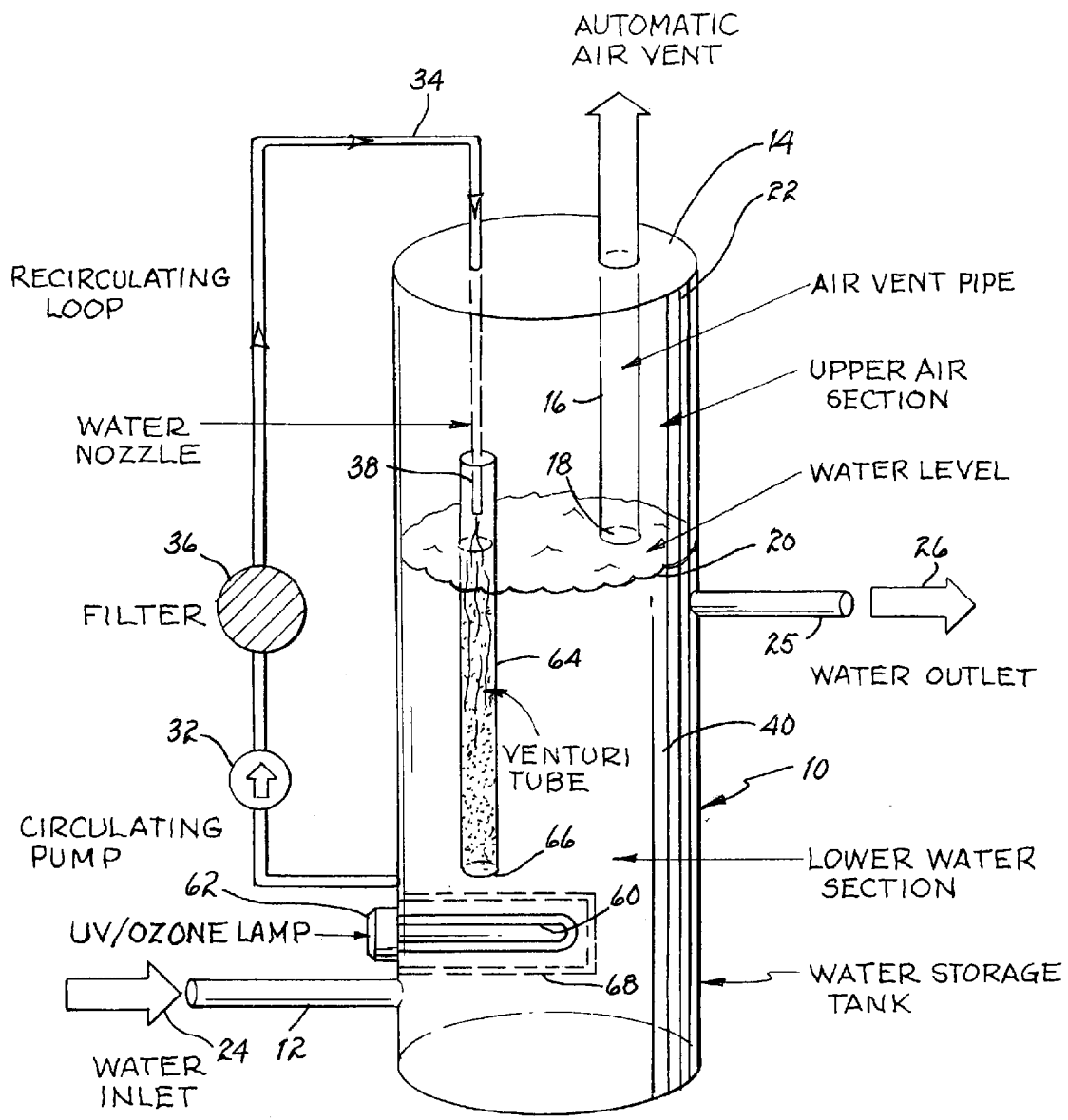
FIG. 3 illustrates a water storage tank as shown in FIG. 1 including a submerged UV lamp for irradiating microorganisms in the water and for converting oxygen molecules in entrained air into ozone molecules to enhance oxidizing organic and inorganic matter.

FIG. 3 illustrates a second variant of tank 10 illustrated and described in detail in FIG. 1. Accordingly, the following description is primarily directed to the improvements embodied in the second variant. A UV lamp 60 is mounted within the lower one section of tank 10 by a mounting 62 which will provide mechanical support and electrical power. A tube 64 (venturi tube) extends above water level 20 to receive therein a nozzle 38. Thereby, the stream of water flowing through conduit 22 is discharged from nozzle 38 into tube 64 which causes entrainment of the air from within head space 34 into the stream of water. As the stream of water flows downwardly through tube 64 under force as a result of the action of nozzle 38, the air entrained water will flow out of outlet 66 at the bottom of the tube. By locating the outlet proximate UV lamp 60, the entrained air will become irradiated. The irradiation will cause some of the oxygen molecules present to be converted to ozone molecules. Such conversion is particularly enhanced if the wavelength of the ultraviolet light is 185 nm (UV 185). The ozone molecules now entrained within water 40 in tank 10 will have an oxidizing effect upon both organic and inorganic matter coming in contact therewith. Furthermore, if the wavelength radiation from UV lamp 60 is at or about 254 nm (UV 254), irradiation will have the effect of disinfecting the water by serving in the manner of a virucide and germicide.

By placing outlet 66 of tube 64 toward the bottom of tank 10, the upward migration of entrained air and ozone will enhance circulation of the water within the tank. Such circulation will result in enhanced exposure of the water to both UV lamp 60 and the ozone molecules produced by radiation from the UV lamp.

Under some circumstances, it may be beneficial to enclose UV lamp 60 within a shroud 68, as shown in dashed lines. Necessarily, the shroud must be of material transmissive to ultraviolet light (UV185 and UV254).

To enhance conversion of oxygen molecules to ozone molecules, UV lamp may be mounted vertically (not shown). By locating outlet 66 proximate the lower end of the UV lamp, the air bubbles entrained in the water will migrate upwardly adjacent or in proximity to the UV lamp to increase the time of exposure of the air bubbles to UV radiation from the UV lamp. This additional exposure will enhance the production of ozone molecules. Moreover, virucidal and germicidal effects of the UV radiation will be enhanced.

We claim:

1. A pressurized water tank having a lower water section, an upper air section serving as a head space, and terminated by a top, an inlet conduit for conveying water under pressure into the lower water section, an outlet conduit for discharging water from the lower water section and a vent extending from a location exterior of said tank into said tank, the improvement comprising in combination:
- a) a pump;
- b) a first conduit extending from the lower water section to said pump for conveying water;
- c) a second conduit extending from said pump into the head space;
- d) a nozzle for terminating said second conduit and discharging a stream of water into the head space; and
- e) a tube partially surrounding the second conduit and nozzle and extending from an inlet in the head space to an outlet in the lower water section for receiving the stream of water from said nozzle and to augment entrainment of air from the head space into the stream of water and further for conveying the air entrained water into the lower water section.

2. The improvement as set forth in claim 1 wherein the vent extends through the top into said tank.

3. The improvement as set forth in claim 1 wherein said nozzle is located essentially coincident with a longitudinal axis of said tube.

4. The improvement as set forth in claim 1 including a UV lamp disposed within the head space of said tank for generating ultraviolet light at a wavelength for converting oxygen molecules into ozone molecules.

5. The improvement as set forth in claim 4 wherein said UV lamp generates ultraviolet light at a wavelength which provides a virucidal and a bactericidal effect on microorganisms.

6. The improvement as set forth in claim 4 wherein said UV lamp is mounted within the water of the tank and wherein said outlet of said tube is proximate said UV lamp to convert oxygen molecules into ozone molecules.

7. The improvement as set forth in claim 6 wherein said nozzle is located essentially coincident with a longitudinal axis of said tube.

8. The improvement as set forth in claim 6 wherein said UV lamp generates a wavelength having a virucidal and a bactericidal effect on microorganisms.

9. The improvement as set forth in claim 1 wherein said UV lamp is mounted within the lower water section and wherein said outlet of said tube is proximate said UV lamp to subject air entrained water discharged from said outlet of said tube into proximity with said UV lamp to urge conversion of oxygen molecules in the air into ozone molecules.

10. The improvement as set forth claim 9 wherein said nozzle is located essentially coincident with a longitudinal axis of said tube.

11. The improvement as set forth claim 9 wherein said UV lamp generates a wavelength of ultraviolet light having a virucidal and a bactericidal effect on microorganisms.

12. A water tank having a lower water section, an upper air section serving as a head space, an inlet conduit for conveying water under pressure into the lower water section, an outlet conduit for discharging water from the lower water section; the improvement comprising in combination:
- a) a pump;
- b) a first conduit extending from the lower water section to said pump for conveying water;
- c) a second conduit extending from said pump into the head space;
- d) a nozzle for terminating said second conduit and discharging a stream of water into the head space; and
- e) a tube partially surrounding the second conduit and nozzle and extending from an inlet in the head space to an outlet in the lower water section for receiving the stream of water from said nozzle and to augment entrainment of air from the head space into the stream of water and further for conveying the air entrained water into the lower water section.

13. The improvement as set forth in claim 12 wherein said tube is a venturi.

14. The improvement as set forth in claim 12 wherein said nozzle is located essentially coincident with a longitudinal axis of said tube.

15. The improvement as set forth in claim 12 including a UV lamp disposed within said tank in proximity to said outlet of said tube for generating wavelength of ultraviolet light for converting oxygen molecules in the air entrained stream of water from said outlet into ozone molecules to urge oxidation of organic matter that may be present in the water.

16. The improvement as set forth in claim 15 wherein said UV lamp generates a wavelength of ultraviolet light having a virucidal and bactericidal effect on microorganisms.

17. The improvement as set forth in claim 15 wherein said UV lamp is mounted within the head space to convert oxygen molecules into ozone molecules for entrainment in the stream of water from said nozzle.

18. The improvement as set forth in claim 17 wherein said UV lamp generates a wavelength of ultraviolet light having a virucidal and a bactericidal effect on microorganisms.

19. The improvement as set forth in claim 15 wherein said UV lamp generates a wavelength of ultraviolet light having a virucidal and bactericidal effect on microorganisms.

20. The improvement as set forth in claim 15 wherein said UV lamp is mounted within the lower water section and wherein said outlet of said tube is proximate said UV lamp to subject air entrained water discharged from said outlet of said tube into proximity with said UV lamp to urge conversion of oxygen molecules in the air into ozone molecules.

21. The improvement as set forth in claim 20 wherein said nozzle is located essentially coincident with a longitudinal axis of said tube.

22. The improvement as set forth in claim 20 wherein said UV lamp generates a wavelength of ultraviolet light having a virucidal and bactericidal effect on microorganisms.

23. A method for purifying water in a pressurized water tank having a lower water section, an upper air section serving as a head space and terminated by a top, a water inlet for conveying water under pressure into the lower section, an outlet conduit for discharging water from the lower water section and a vent extending through the top from a location exterior of the tank into the tank, said method comprising the steps of:
- a) pumping water from the lower water section into the head space through a conduit;
- b) discharging a stream of water from the conduit to entrain air in the head space in the water discharged;
- c) further discharging the air entrained stream of water into a venturi tube partially surrounding the conduit and extending from the head space into the lower water section to augment entrainment of the air and to convey the air entrained water below the water surface of the lower water section to aerate and assist in purifying the water resulting from the oxidizing effect of the air in the water.

24. The method as set forth in claim 23 including the step of generating ozone molecules from the oxygen molecules in the air with a UV lamp to accommodate entrainment of the ozone molecules in the water.

25. The method as set forth in claim 24 wherein the UV lamp is submerged in the lower water section and wherein the tube includes an outlet proximate the UV lamp and including the step of converting oxygen entrained molecules in the lower water section into ozone entrained molecules to augment oxidation and purification of the water.

26. The method as set forth in claim 25 including the step of radiating from the UV lamp a wavelength having a virucidal and bactericidal effect on microorganisms in the water.

27. The method as set forth in claim 24 including the step of radiating from the UV lamp a wavelength having a virucidal and bactericidal effect on microorganisms in the water.

* * * * *